US011099820B2

(12) United States Patent
Punathil et al.

(10) Patent No.: US 11,099,820 B2
(45) Date of Patent: Aug. 24, 2021

(54) RECONFIGURING APPLICATION SOFTWARE INTO MICROSERVICE ARCHITECTURE

(71) Applicant: International Business Machines Corporation, Armonk, NY (US)

(72) Inventors: Gireesh Punathil, Kerala (IN); Vijayalakshmi Kannan, Bangalore (IN); Deepthi Sebastian, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/445,880

(22) Filed: Jun. 19, 2019

(65) Prior Publication Data

US 2020/0401386 A1 Dec. 24, 2020

(51) Int. Cl.
*G06F 8/41* (2018.01)
*G06F 8/71* (2018.01)
*G06F 8/75* (2018.01)

(52) U.S. Cl.
CPC .............. *G06F 8/436* (2013.01); *G06F 8/433* (2013.01); *G06F 8/71* (2013.01); *G06F 8/75* (2013.01)

(58) Field of Classification Search
CPC ............. G06F 8/436; G06F 8/433; G06F 8/71
USPC ........................................................ 717/143
See application file for complete search history.

(56) References Cited

U.S. PATENT DOCUMENTS

| 6,985,939 | B2 | 1/2006 | Fletcher | |
|---|---|---|---|---|
| 7,266,582 | B2 | 9/2007 | Stelting | |
| 8,181,153 | B2 | 5/2012 | Grechanik | |
| 10,346,338 | B2 * | 7/2019 | Hamilton, II | G06F 9/44505 |
| 2003/0188039 | A1 | 10/2003 | Liu | |
| 2007/0038648 | A1 | 2/2007 | Chetwood | |
| 2013/0304788 | A1 * | 11/2013 | DeLuca | G06F 8/61 709/201 |
| 2015/0127828 | A1 * | 5/2015 | Bostick | H04L 43/04 709/224 |
| 2015/0309813 | A1 * | 10/2015 | Patel | G06F 8/75 703/22 |
| 2017/0034016 | A1 | 2/2017 | Carroll | |
| 2017/0364434 | A1 | 12/2017 | Kairali | |
| 2018/0039570 | A1 * | 2/2018 | Rajagopalan | G06F 11/3688 |

(Continued)

FOREIGN PATENT DOCUMENTS

| CN | 107391142 A | 11/2017 |
|---|---|---|
| CN | 108279926 A | 7/2018 |

OTHER PUBLICATIONS

"Block Merging", © 2011-2012 Nullstone Corporation, Printed May 17, 2019, 2 pages, <http://compileroptimizations.com/category/block_merge.htm>.

(Continued)

*Primary Examiner* — Lewis A Bullock, Jr.
*Assistant Examiner* — Theodore E Hebert
(74) *Attorney, Agent, or Firm* — Edward J. Wixted, III

(57) ABSTRACT

An automated method extracts the topology of a software application, identifies static and runtime internal code flow, data flow, dependencies, accessibility, reachability, and resource consumption characteristics of the application. The method identifies code refactoring boundaries, and helps to adapt and/or re-configure the software application into a set of microservices for deployment in a cloud environment.

20 Claims, 12 Drawing Sheets

(56) References Cited

U.S. PATENT DOCUMENTS

2018/0365008 A1* 12/2018 Chandramouli .......... G06F 8/76
2019/0012155 A1*  1/2019 Oey ........................ G06F 8/443
2019/0108067 A1*  4/2019 Ishikawa ................. H04L 41/50
2019/0324744 A1* 10/2019 Alam ........................ G06F 8/31

OTHER PUBLICATIONS

"How can you refactor a monolithic application into microservices?" Neoteric, Apr. 20, 2017, 4 pages, <http//medium.com/@NeotericEU/how-can-you-refactor-a-monolithic-application-into-microservices-2eef8e323840>.
"HPROF: A Heap/CPU Profiling Tool", Oracle Java SE Documentation, Printed May 17, 2019, 6 pages, <https://docs.oracle.com/javase/7/docs/technotes/samples/hprof.html>.
"Inline expansion", From Wikipedia, the free encyclopedia, Page was last edited on Apr. 10, 2019 at 15:19 (UTC), 9 pages, <https://en.wikipedia.org/wiki/inline_expansion>.
"Introduction to transaction traces", New Relic, Printed May 17, 2019, 4 pages, <http://docs.newrelic.com/docs/apm/transactions/transaction-traces>.
"Java Mission Control", Oracle, Printed May 17, 2019, 2 pages, <https://www.oracle.com/technetwork/java/avaseproducts/mission-control/java-mission-control-1998576.html>.
"List of tools for static code analysis", From Wikipedia, the free encyclopedia. This page was last edited on Apr. 17, 2019 at 20:59 (UTC), 11 pages, <https://en.wikipedia.org/wiki/List_of_tools_for_static_code_analysis#Java>.
"Memory Analyzer (MAT)", Eclipse, Printed May 17, 2019, 2 pages, <http://www.eclipse.org/mat>.
"Microservices architecture style", Miscrosoft Azure, Nov. 12, 2018, 4 pages, <https://docs.microsoft.com/en-us/azure/architecture/guide/architecture-styles/microservices>.
"The Award-Winning All-in-One Java Profiler", EJ Technologies, Printed May 17, 2019, 12 pages, <https://www.ej-technologies.com/products/jprofiler/overview.html>.
Abstract Syntax Tree Generator and Viewer, Printed May 17, 2019, 5 pages, <https//marketplace.eclipse.org/content/ast-view>.
Cai et al., "Refactor existing monolithic applications to microservices one bite at a time, Part 2: Migrating the cloud application", IBM Developer Works, Sep. 19, 2017, 30 pages, <https://www.ibm.com/developerworks/library/mw-1709-mulley2-bluemix/index.html>.
Kalske et al., "Challenges when Moving from Monolith to Microservice Architecture", Garrigós I., Wimmer M. (eds) Current Trends in Web Engineering. ICWE 2017. Lecture Notes in Computer Science, vol. 10544. Springer, Cham.
Chung, Mandy, "Java Dependency Analysis Tool", Open JDK Wiki, Last modified Oct. 5, 2016, <https://wiki.openjdk.java.net/display/JDK8/Java+Dependency+Analysis+Tool>.
IBM, "IBM Monitoring and Diagnostic Tools—Health Center", <https://www.ibm.com/support/knowledgecenter/en/SS3KLZ/com.ibm.java.diagnostics.healthcenter.doc/homepage/plugin-homepage-hc,html>.
IBM, "Running with method trace", IBM Knowledge Center, Printed May 17, 2019, 3 pages, <https//www.ibm.com/support/knowledgecenter/en/SSYKE2_7.1.0/com.ibm.java.win.71.doc/diag/tools/mt_running.html>.
IBM, "tprof Command", IBM Knowledge Center, Printed May 17, 2019, 3 pages, <https://www.ibm.com/support/knowledgecenter/en/ssw_aix_72/com.ibm.aix.cmds5/tprof.htm>.
Java Dependency Viewer, Printed May 17, 2019, 14 pages, <https://marketplace.eclipse.org/content/java-dependency-viewer>.
Khalusova, Maria, "IntelliJ Idea: Dependency Analysis with DSM", Posted on Jan. 25, 2008, Jet Brains Intellij Idea Blog, <https://blog.jetbrains.com/idea/2008/01/intellij-idea-dependency-analysis-with-dsm>.
Mell et al., "The NIST Definition of Cloud Computing", Recommendations of the National Institute of Standards and Technology, Special Publication 800-145, Sep. 2011, 7 pages.
Richardson et al., "Microservices From Design to Deployment", NGINX, © 2018, 80 pages, <https://www.nginx.com/resources/library/designing-deployingmicroservices/>.
Brown, Kyle, "Refactoring to microservices, Part 1: What to consider when migrating from a monolith", IBM Developer, Published Apr. 13, 2016, 3 pages, <https://developer.ibm.com/articles/cl-refactor-microservices-bluemix-trs-1/>.

* cited by examiner

```
#javap -v -c java/util/HashSet | grep " = Class "
  #2  = Class  #120  // java/util/HashMap
  #11 = Class  #129  // java/util/LinkedHashMap
  #23 = Class  #139  // java/util/HashSet
  #25 = Class  #140  // java/lang/CloneNotSupportedException
  #26 = Class  #141  // java/lang/InternalError
  #38 = Class  #156  // java/io/InvalidObjectException
  #39 = Class  #157  // java/lang/StringBuilder
  #54 = Class  #170  // java/util/LinkedHashSet
  #56 = Class  #172  // java/util/HashMap$KeySpliterator
  #58 = Class  #176  // java/lang/Object
  #60 = Class  #177  // java/util/AbstractSet
  #61 = Class  #178  // java/util/Set
*
*
*
```

```
#jdeps -R java.util.HashSet
rt.jar -> /Library/Java/JavaVirtualMachines/jdk1.8.0_131.jdk
/Contents/Home/jre/lib/jce.jar
   com.sun.nio.file (rt.jar)
      -> java.lang
      -> java.nio.file
   java.io (rt.jar)
      -> java.io
      -> java.lang
      -> java.lang.invoke
```

RECONFIGURING APPLICATION SOFTWARE INTO MICROSERVICE ARCHITECTURE

BACKGROUND

The present invention relates generally to the field of enterprise software applications, and more particularly to converting a monolithic software application into a set of microservices.

"Microservices" is a software architecture whereby an application is composed of a set of modular, fine-grained services, coupled together to work in concert to perform the functions of the application as a whole. Microservice architecture has emerged as a de-facto standard for large-scale enterprise applications, due in part to a number of factors that may have a direct bearing on development and maintenance costs, factors that include flexibility, scalability, manageability, resilience, nimbleness, etc., to name a few.

SUMMARY

According to an aspect of the present invention, there is a method, computer program product and/or system that performs the following operations (not necessarily in the following order): (i) receiving a software application comprising a plurality of code blocks, including a first code block and a second code block; (ii) semantically parsing, in conjunction with statically analyzing, the plurality of code blocks of the software application, to generate an abstract topology model of the software application where the abstract topology model has a first node and a second node respectively corresponding to the first code block and the second code block; (iii) determining, with respect to inter-relationships among and between the plurality of code blocks: (iii.1) a dependency information; (iii.2) a reachability information, and (iii.3) an accessibility information; (iv) determining, respectively, a plurality of resource consumption profiles for each of the plurality of code blocks, including a first resource consumption profile corresponding to the first code block and a first resource; (v) generating an architectural model of the software application, based on a combination of: (v.1) the abstract topology model, (v.2) the dependency information, (v.3) the accessibility information, (v.4) the reachability information, and (v.5) the first resource consumption profile; and (vi) restructuring the software application into a plurality of microservices based, at least in part, on the architectural model.

BRIEF DESCRIPTION OF THE DRAWINGS

FIG. 4 is a screenshot generated in accordance with at least one embodiment of the present invention;

FIG. 7 is a screenshot generated in accordance with at least one embodiment of the present invention;

DETAILED DESCRIPTION

Figure 1:
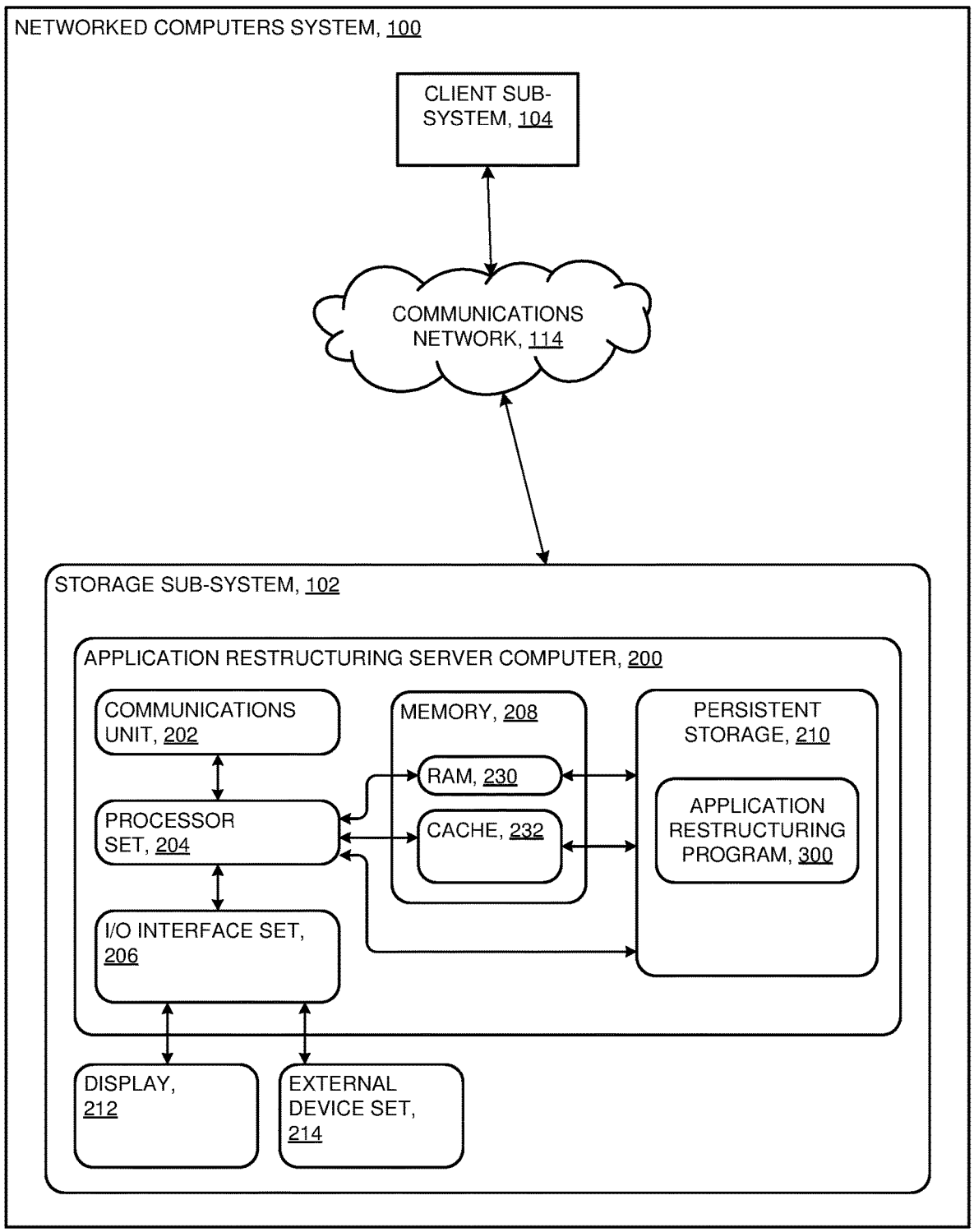
FIG. 1 is a block diagram of a first embodiment of a system according to the present invention.

Some embodiments of the present invention provide a convenient, automated method to extract abstract and deep insights into the topology of a software application (sometimes herein referred to as a "monolithic application", or simply an "application"), and identify internal code flow (sometimes herein referred to as "control flow"), data flow, and resource consumption characteristics of the application. Embodiments further provide a direct and comprehensive method to identify code refactoring boundaries, and help to adapt or re-configure a monolithic application into a set of microservices for deployment in a cloud environment.

Systems and methods in accordance with some embodiments of the present invention programmatically analyze a monolithic software application to discover inferences, develop recommendations, and help to refactor, or in fact do refactor, the code of the application, to transform the application into a plurality of independent microservices. At least one embodiment of the present invention includes the following operations: (i) performing static analysis, through semantic parsing, of source code, object code, and/or compiled code of an application; (ii) determining the internal composition of the application; (iii) determining one or more modules that do not depend on other parts of the application, to identify an initial set of potential microservices; (iv) performing memory access pattern analysis of the application at runtime and leveraging that information to refine the list of potential microservices; (v) performing runtime profiling on the application to compute patterns on resource consumption and code coverage, and leveraging the information gained to further refine the list of potential microservices; (vi) elevating code (functions, classes and other units of code) and generating an architectural blueprint thereof for the desired microservices in an easily consumable manner.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: storage sub-system 102; client sub-system 104; communication network 114; application restructuring server computer 200; communications unit 202; processor set 204; input/output (I/O) interface set 206; memory device 208; persistent storage device 210; display device 212;

external device set 214; random access memory (RAM) devices 230; cache memory device 232; and application restructuring program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via communication network 114. Application restructuring program 300 is a collection of machine readable instructions and/or data that is used to create, manage, and control certain software functions that will be discussed in detail, below, in the Example Embodiment sub-section of this Detailed Description section.

Sub-system 102 is capable of communicating with other computer sub-systems via communication network 114. Communication network 114 can be, for example, a local area network (LAN), a wide area network (WAN) such as the Internet, or a combination of the two, and can include wired, wireless, or fiber optic connections. In general, communication network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory device 208 and persistent storage device 210 are computer-readable storage media. In general, memory device 208 can include any suitable volatile or non-volatile computer-readable storage media. It is further noted that, now and/or in the near future: (i) external device set 214 may be able to supply, some or all, memory for sub-system 102; and/or (ii) devices external to sub-system 102 may be able to provide memory for sub-system 102.

Application restructuring program 300 is stored in persistent storage device 210 for access and/or execution by one or more of the respective computer processor set 204, usually through one or more memories of memory device 208. Persistent storage device 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage device 210.

Application restructuring program 300 may include both machine readable and performable instructions and/or substantive data (that is, the type of data stored in a database). In this particular embodiment, persistent storage device 210 includes a magnetic hard disk drive. To name some possible variations, persistent storage device 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage device 210 may also be removable. For example, a removable hard drive may be used for persistent storage device 210. Other examples include optical and magnetic disks, thumb drives, and smart cards that are inserted into a drive for transfer onto another computer-readable storage medium that is also part of persistent storage device 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with application restructuring server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, application restructuring program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature, herein, is used merely for convenience, and, thus, the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. Example Embodiment

Figure 2:
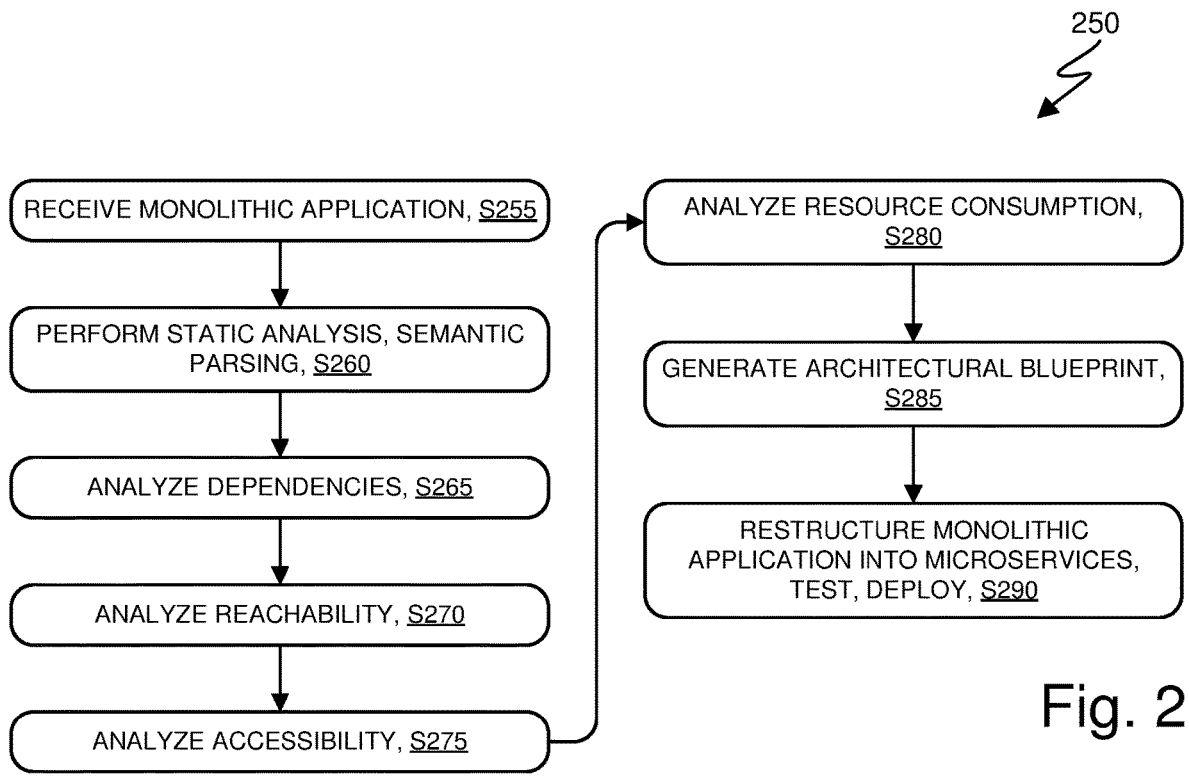
FIG. 2 is a flowchart showing a first embodiment method performed, at least in part, by the first embodiment system.
Figure 3:
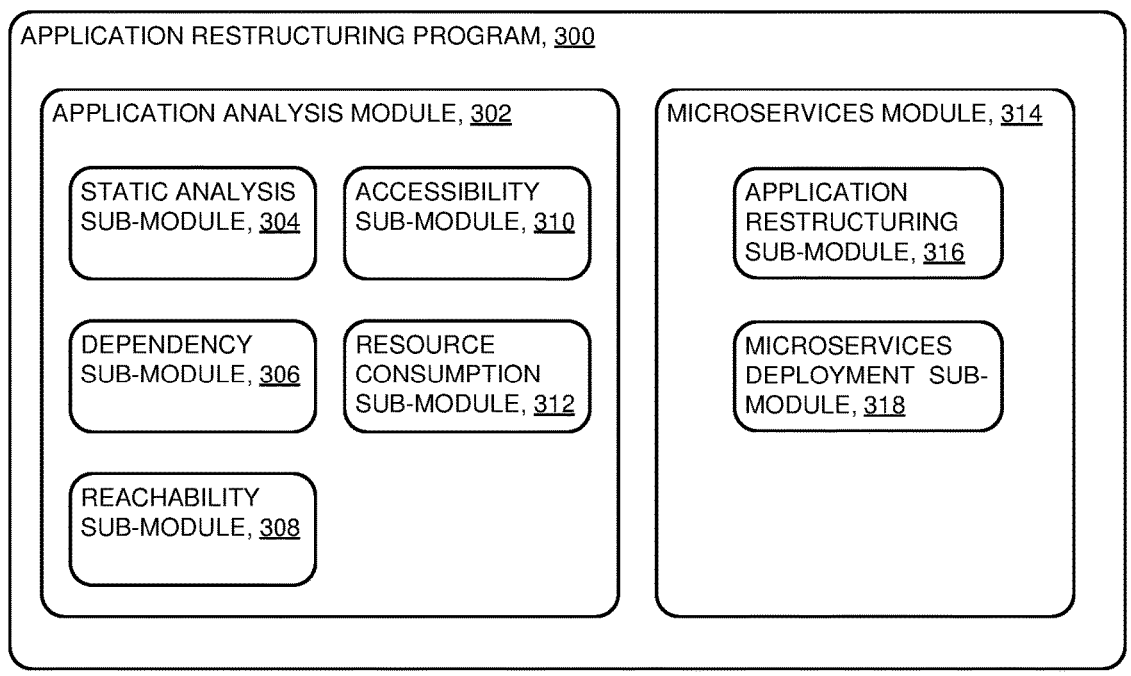
FIG. 3 is a block diagram showing a machine logic (for example, software) portion of the first embodiment system.

FIG. 2 shows flowchart 250 depicting a method according to the present invention. FIG. 3 shows application restructuring program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where application restructuring application restructuring program 300 receives a monolithic software application (the application) to be automatically re-structured into a set of microservices. In some embodiments, the application is written in one or more object-oriented programming languages, such as Java™, and comprises a collection of various classes. (Java and all Java-based trademarks and logos are trademarks or registered trademarks of Oracle and/or its affiliates.)

Processing proceeds at operation S260, where static analysis sub-module 304, of application analysis module 302, of application restructuring application restructuring program 300, performs static analysis and semantic parsing of the application, to produce an abstract visualization of the application topology. See abstract topology diagram 500, of FIG. 5, discussed below in the Further Comments and/or Embodiments sub-section of this Detailed Description section, for an example output generated by static analysis and semantic parsing.

Processing proceeds at operation S265, where dependency sub-module 306 of application analysis module 302 performs a dependency analysis of the application. The dependency analysis determines dependency relationships among and between blocks of code (functions, classes and modules, routines, sub-routines, etc. to name a few examples), based at least in part on the abstract topology diagram produced in operation S260 above.

In some embodiments of the present invention, dependency sub-module 306, determines dependencies of code blocks by reference to results from the static analysis and semantic parsing of operation S265 above (the abstract topology diagram). Dependency sub-module 306 further observes performance of the application during runtime to gather information that may be available only at runtime.

A result produced by the dependence analysis includes a dependency diagram. Nodes, of the dependency diagram, model respectively corresponding code blocks. Edges between nodes of the diagram model interrelationships among and between the code blocks. Further details are discussed in the text below, under the sub-heading "Dependency Analysis" in the Further Comments and/or Embodiments subsection of this Detailed Description section, and in connection with dependency diagram 600 of FIG. 6.

Processing proceeds at operation S270, where reachability sub-module 308 of application analysis module 302 analyzes code blocks of the application to discover reachability relationships among and between the code blocks. The reachability analysis integrates the reachability information into the dependency diagram (see FIG. 6) to produce a reachability diagram (sometimes referred to as a "control flow graph"). Further details are discussed in the text below, under the sub-heading "Reachability Analysis", in connection with reachability diagram 800, of FIG. 8, in the Further Comments and/or Embodiments subsection of this Detailed Description section.

Processing proceeds at operation S275, where accessibility sub-module 310 of application analysis module 302 analyzes the application to discover the ability, or inability (respectively accessibility, or inaccessibility), of certain code blocks (or modules) in the application to access global data, as well as data local to certain code blocks or groupings of code blocks (modules or groups of modules). Accessibility analysis merges accessibility information with the dependency diagram produced in operation S265 above, to produce an accessibility analysis diagram (sometimes herein referred to as a control flow graph). Further details are discussed in the text below, under the sub-heading "Accessibility Analysis", in connection with control flow graph 900, of FIG. 9, in the Further Comments and/or Embodiments subsection of this Detailed Description section.

Figure 10:
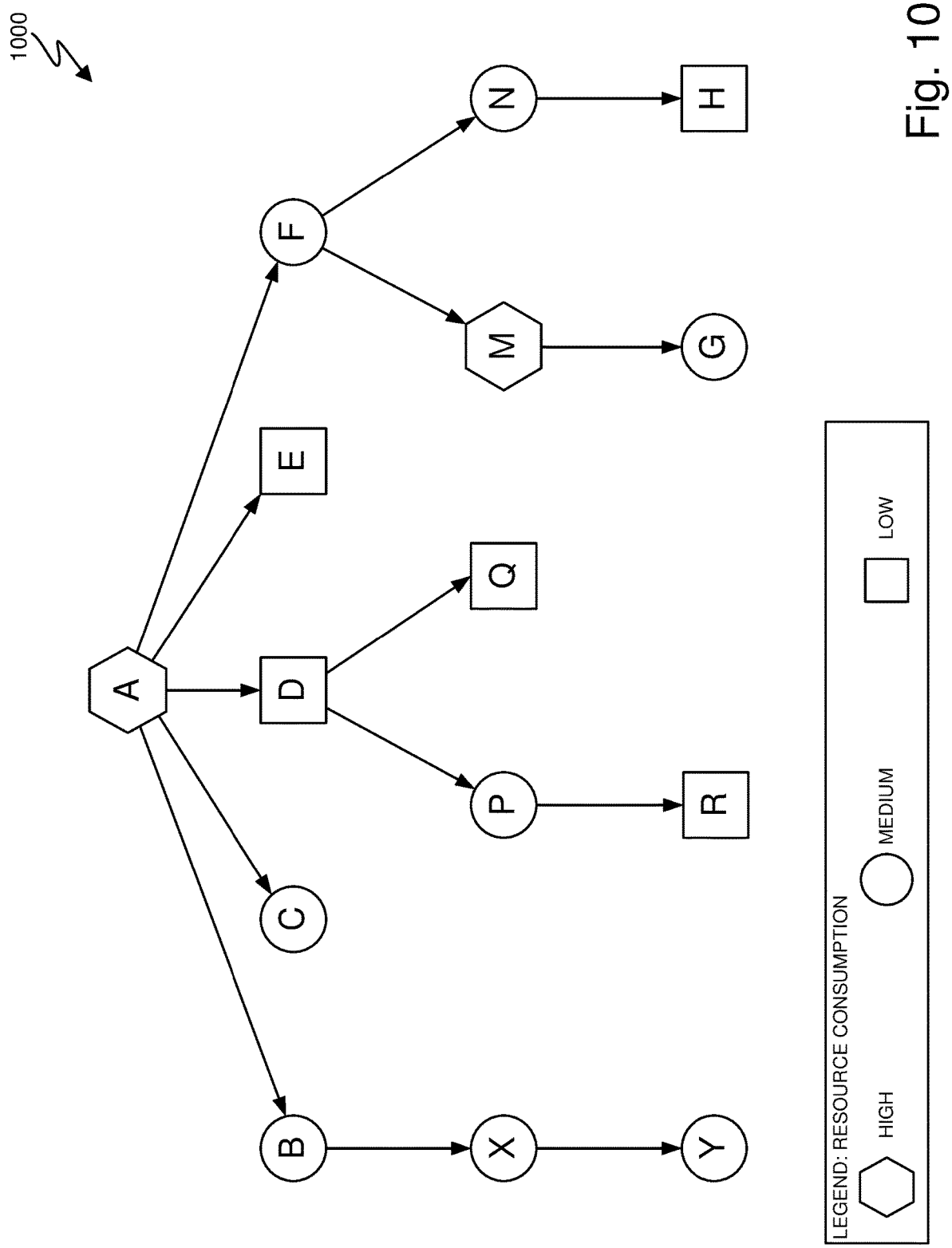
FIG. 10 is a weighted control flow graph showing information that is generated in accordance with at least one embodiment of the present invention.

Processing proceeds at operation S280, where resource consumption sub-module 312 of application analysis module 302, analyzes resource utilization profiles of code blocks (functions, classes and modules, routines, sub-routines, etc.) Resource consumption sub-module 312 determines a resource consumption profile for a given code block, by: (i) analyzing the given code block and calculating one or more predicted amounts of resource consumption; and/or (ii) by monitoring the given code block at runtime, to determine one or more resources consumed by each code block. Resource consumption analysis further processes each node in dependency diagram (see FIG. 6), to assign a resource consumption profile of each code block to a respectively corresponding node of the dependency diagram. In some embodiments, each node is assigned multiple resource consumption profiles corresponding, for example, to memory usage (memory footprint, meaning how much memory is devoted to running the code represented by a given node), storage usage (storage footprint, meaning how much storage space is devoted to the code represented by the given node), input/output (I/O) traffic, network bandwidth usage, CPU usage (for example, clock cycles, percent of CPU capacity), etc. In some embodiments, resource usage includes a power increment (for instance, measured in milliwatts), or an absolute energy usage measurement (for instance, milliwatt-seconds) for the computer hardware to process a given module or code block. Resource consumption sub-module 312 overlays the utilization profiles onto the reachability diagram (see FIG. 8), to produce a resource consumption analysis diagram. Further details are discussed in the text below, under the sub-heading "Resource Consumption Analysis", in connection with weighted control flow graph 1000, of FIG. 10, in the Further Comments and/or Embodiments subsection of this Detailed Description section.

Processing proceeds at operation S285, where application restructuring sub-module 316, of microservices module 314, generates an architectural blueprint of the application where the blueprint models the application as a set of microservices. See architectural blueprint 1300 of FIG. 13. Further details are discussed in the text below, under the sub-heading "*An example: Restructuring Monolithic Application into Microservices*" in the Further Comments and/or Embodiments subsection of this Detailed Description section.

Processing proceeds at operation S290 where, in some embodiments, application restructuring sub-module 316 restructures the application into a set of microservices in accordance with the architectural blueprint developed at operation S285 above.

In some embodiments of the present invention, microservices deployment sub-module 318 configures the set of microservices into a set of containers. The original monolithic application has been reconfigured as a containerized application comprising a set of microservices. In some embodiments, microservices deployment sub-module 318 deploys and orchestrates the set of containers in a production test environment using, for example, an open-source system for automating deployment, scaling, and management of containerized applications (for instance, Kubernetes).

In some embodiments of the present invention, microservices deployment sub-module 318 tests the containerized application in the production test environment. Once testing is successfully completed, microservices deployment submodule 318 deploys the containerized application in a production environment.

III. Further Comments and/or Embodiments

Microservices, sometimes called microservice architecture, is a modular architecture style which defines a loosely connected, self-sufficient and fine-grained set of software code modules. Each code module (microservice) exposes a single functional interface. Microservice architecture aims to achieve infinite (unlimited) scalability.

Some embodiments of the present invention may recognize at least the following facts, potential problems, and/or potential areas for improvement with respect to the current state of the art: a large scale enterprise application may be difficult to convert into a set of microservices as the application may contain coarse-grained services. This coarse-grained architecture imposes challenges in isolating code, data, configurations, interfaces and invocation perspectives. There exist legacy software applications, at various stack levels and volumes, that are monolithic in design. These legacy applications still provide technical features and business value to their owners and users. However, managing these applications, and/or migrating them to a cloud based computing environment, for example as microservices, may be challenging.

Some embodiments of the present invention perform both static software analysis and dynamic software analysis. Static analysis is performed by examination of source code, object code, and/or compiled code. Static analysis does not involve executing the code. Dynamic analysis is performed during code execution, to capture information with respect to, for example, dynamic linking and code generated during program execution, and other things that can be determined only during program execution, and therefore is not discoverable by static analysis alone. Information discovered during dynamic analysis may differ from one execution instance to another, from one machine to another, and from one configuration to another.

Some embodiments of the present invention may include one, or more, of the following features, characteristics, and/or advantages: (i) uses a specialized, but generic, approach that is intrinsic to the runtime and platform where the application is hosted; (ii) performs well irrespective of the characteristics of the application; (iii) infers the internal layout, interdependency between code and data, and resource utilization of the application; (iv) splits an application into a plurality of microservices; (v) analyzes the structural layout of the application, and provides and records a microservice table based on the analysis; (vi) refactors the application based at least in part on the microservice table; (vii) aggregates and/or segregates services; (viii) traces services to gain internal insights; and/or (ix) tests services with calibration data to detect service scope, etc.

A monolithic application developed in Java programming language may be used herein for illustration, though the methods described apply equally well to applications developed in any other language.

Some embodiments of the present invention include five passes (or phases; in the context of this list, the terms "pass" and "phase" are used synonymously and interchangeably) to analyze the application: (i) static analysis and semantic parsing; (ii) dependency analysis; (iii) reachability analysis; (iv) accessibility analysis; and (v) resource consumption analysis. These phases will are explained in detail below, with reference to the Figures.

Analysis tools used in some embodiments of the present invention, include: (i) a static code analysis tool (for instance, for Java or any applicable language); (ii) an abstract syntax tree generator and viewer; and/or (iii) various dependency viewers.

Static Analysis and Semantic Parsing

Static analysis and semantic parsing (the first pass) analyzes and semantically parses the source code, object code, and/or compiled code of the monolithic application (the input file(s)), to determine the structural layout (sometimes referred to as sniffing the architecture) of the application. Due to the nature of dynamic code loading in certain languages, as well as code generation and code processing, the static analysis and semantic parsing phase may provide only partial information. In some embodiment, information that is available only at runtime is gathered elsewhere (not during static analysis and semantic parsing) in the process.

In some embodiments, static analysis inspects the constant pool of application classes of the application, and traverses each class recursively, in a depth-first-search manner, to generate a tree structure that represents all the dependencies of each examined class.

Code block 400, of FIG. 4, shows how an example class, "Java.util.HashSet", defines its dependent classes.

Figure 5:
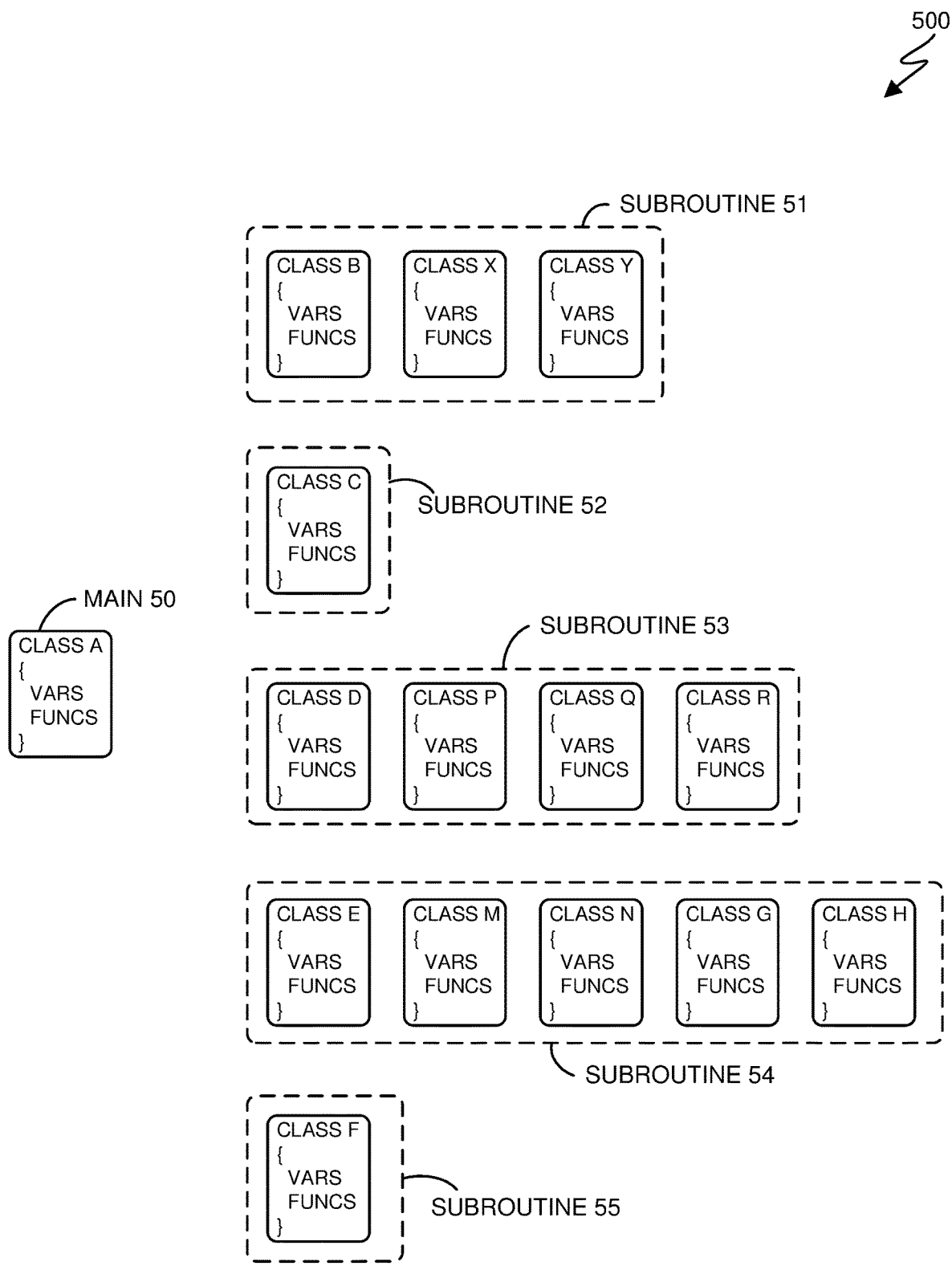
FIG. 5 is an abstract topology diagram showing information that is generated in accordance with at least one embodiment of the present invention.

In some embodiments of the present invention, static analysis and semantic parsing generates an abstract topology diagram, for example, abstract topology diagram 500, of FIG. 5. The diagram visualizes the application topology in abstract form. Abstract topology diagram 500 is sometimes herein referred to as a "static analysis diagram". Abstract topology diagram 500 shows each class making up a monolithic application. Each class may encompass any number of variables and functions (respectively, "VARS" and "FUNCS"). In some embodiments, further details, such as lists of variables and functions, are shown within each class.

Main 50 ("Class A"), of abstract topology diagram 500, is at the top of the class hierarchy of the example application. Main 50 can make calls to: subroutine 51 (comprised of classes B, X, and Y); subroutine 52 (comprised of class C); subroutine 53 (comprised of classes D, P, Q, and R); subroutine 54 (comprised of classes E, M, N, G, and H); and subroutine 55 (comprised of class F).

Tools for proofing implementation for static analysis and semantic parsing include for example: (i) Eclipse integrated development environment (IDE); (ii) IntelliJ IDEA; (iii) Java Profiler ('javap'); (iv) Java Classloader (that recursively loads classes based on identified internal dependencies), etc.

Dependency Analysis.

In some embodiments of the present invention (for example embodiments that involve modular Java language), dependency analysis entails use of a Java dependency analyzer. For platforms and languages that do not have in-built modularity semantics, this step (using Java dependency analyzer) may be neither required nor meaningful.

Dependency analysis establishes existing dependencies between code blocks (a dependency profile for the application as a whole), at a level of abstraction higher than is shown in abstract topology diagram 500. Dependency analysis considers code blocks to be at function, class, or module level. To perform the dependency analysis, the abstract form of the application topology (see abstract topology diagram 500) generated in the static analysis and semantic parsing phase is used as the input, in combination with runtime profiling of the application. This is because information on abstract functions, virtual functions, dynamically generated classes, dynamically loaded classes and/or objects etc. may be available only at runtime. Embodiments independently subject each node in abstract topology diagram 500 to this dependency analysis.

Figure 6:
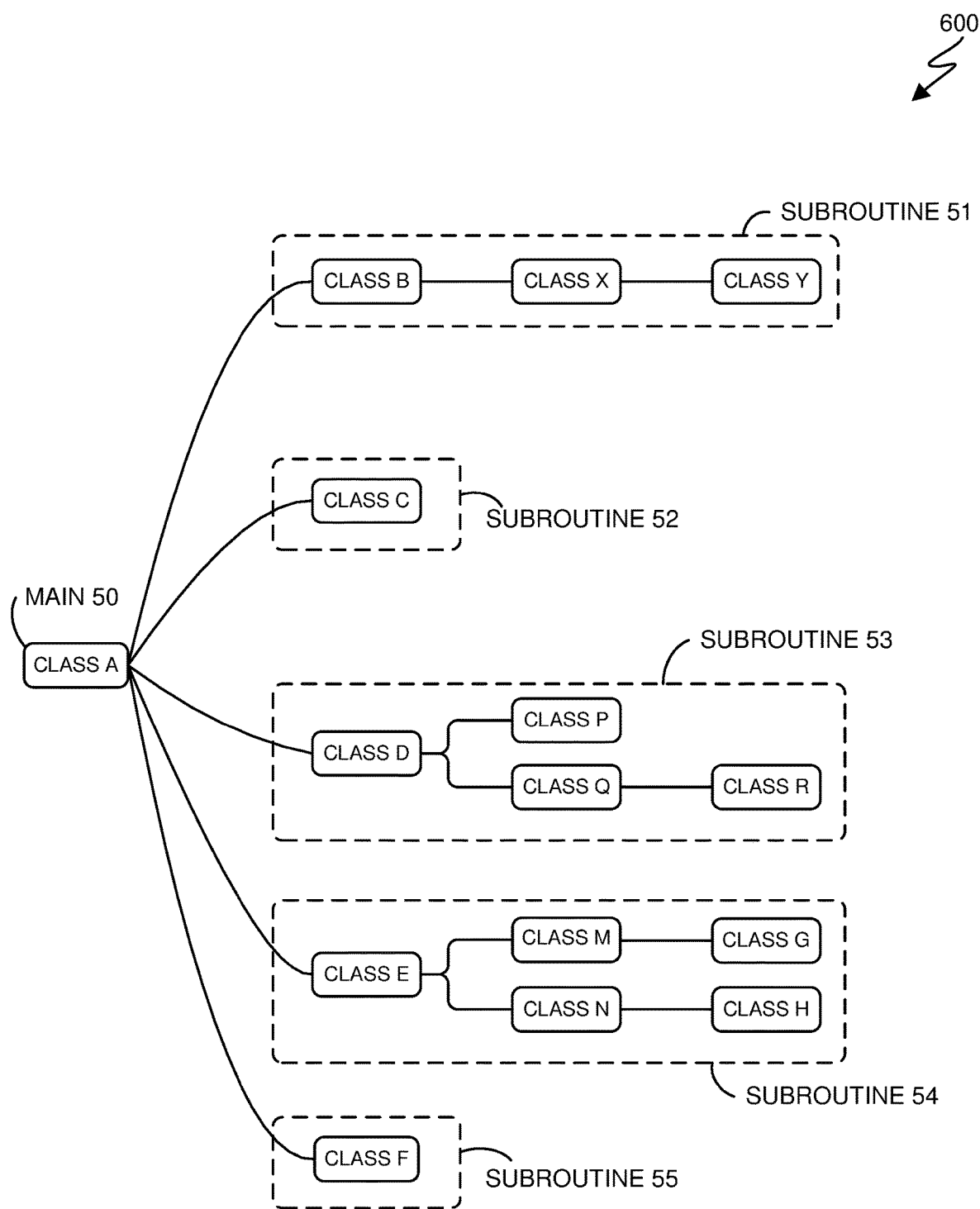
FIG. 6 is a dependency diagram showing information that is generated in accordance with at least one embodiment of the present invention.

In some embodiments, dependency analysis segregates the application, based on perceived dependencies between functions, classes and modules that take part in the application's own internal composition, as shown in dependency diagram 600, of FIG. 6, (sometimes called the dependency graph). Based on abstract topology diagram 500, dependency diagram 600 includes dependencies among and between functions, classes and modules (nodes).

Dependency diagram 600 is a tree view data structure result of the above two passes (static analysis/semantic parsing, and dependency analysis), showing the application and all its dependent modules. Each node represents a module (a unit of code)—function, class or jar file, etc.— with the exact unitization being implementation dependent.

Dependency diagram 600 shows the following dependencies: Class A (main 50) depends on classes B, C, D, E, and F; class B depends on class X, which in turn depends on class Y; class D depends on class P, and class Q which in turn depends on class R; class E depends on classes M and N, which in turn respectively depend on classes G and H.

In some embodiments of the present invention, implementation proof for phase two (dependency analysis) can be, for instance, a Java class dependency analyzer, an example output of which is shown in tree view data structure 700, of FIG. 7.

Reachability Analysis.

Figure 8:
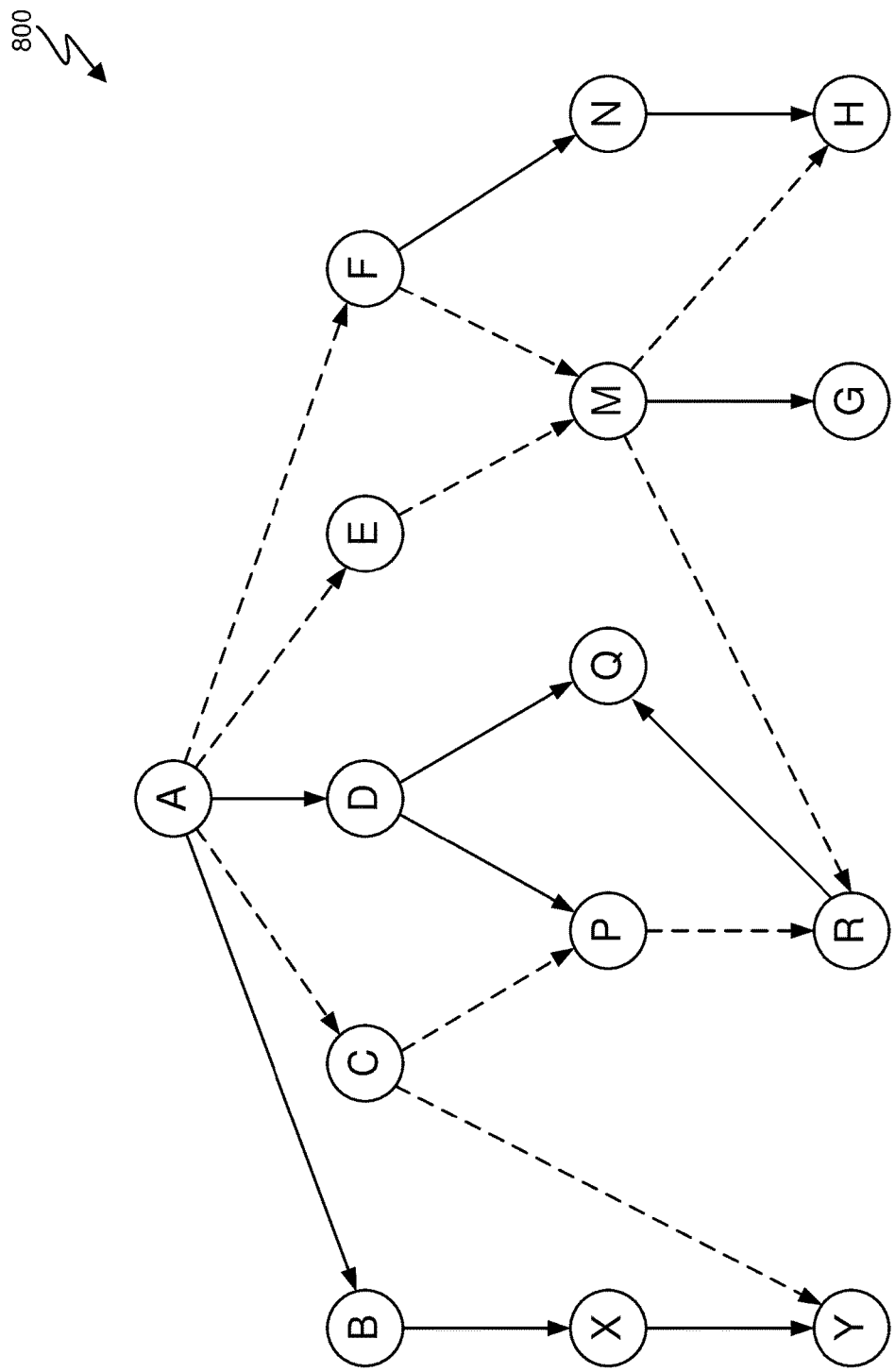
FIG. 8 is a reachability diagram showing information that is generated in accordance with at least one embodiment of the present invention.

In some embodiments of the present invention, the third pass (reachability analysis) further integrates dependency diagram 600, and focuses on code reachability, to produce reachability diagram 800, of FIG. 8, a reachability profile for the application as a whole. Reachability analysis subjects the application to runtime code flow analysis. (In some embodiments, reachability analysis runtime code flow analysis is performed against each module of the application.) The analysis starts at the entry point, and ends at the exit point. For a web application this may constitute a request-response cycle. Function invocations, conditionals and loops are placed as nodes in the graph. Connections with target nodes forms graph edges. Reachability diagram 800 is an example of a such a graph.

Some embodiments of the present invention consider a class as a unit of code. Hence, reachability diagram 800 can be reduced such that nodes represent classes, and edges represent method invocations. This is because, in some embodiments, an end goal is to generate a model that encompasses high level modules, not internal class structures. In some other embodiments, an end goal is a model that includes aspects of internal class structures.

The data structure resulting from the code flow analysis is a control flow graph (see FIG. 9 below with respect to the fourth pass, "accessibility analysis") which is structurally aligned with dependency diagram 600 (the dependency graph), though the two graphs potentially differ in their internal circuits. This is because in some cases, the compile time dependency may not be realized in runtime, or runtime dependency would have been introduced in some other cases.

In reachability diagram 800, the nodes (for example, A, B, etc.) represent modules (sometimes referred to as code units). The smallest module (code unit) is a class. Solid-line edges (for example, the edge from A to B) represent dependencies between the modules (as identified in the first and second passes). The dashed-line edges (for example, the edge from A to C) represent the static dependencies as well as runtime control flow.

The runtime control flow can change between configurations, and can sometimes be a subset of static dependencies. From an architectural perspective, the dependencies that appear in both analyses (dependency and reachability), under some configurations, provide a true picture of the internal layout of the application.

Reachability analysis refines the initial set of modules (in the application) by short-listing those modules which appear in both the static analysis phase and the reachability phase (in other words, modules which appear in both abstract topology diagram 500 and reachability diagram 800). The rationale for short-listing those modules is that when one or more classes/modules are represented by dependency analysis and code flow analysis in the same manner, it provides sufficient evidence that those modules truly are related through a compile time and runtime dependency.

The output of pass three (reachability analysis), reachability diagram 800 (sometimes herein referred to as a control flow graph), is weighted with results from the code flow analysis.

In some embodiments of the present invention, implementation proof for pass three can be any sampler, tracer, profiler, or dynamic compiler, etc., for example a Java development kit method tracer.

Accessibility Analysis.

The fourth pass (accessibility analysis) further integrates each node in dependency diagram 600 (the dependency graph) and focuses on data accessibility. Accessibility analysis subjects the application to runtime data flow analysis, starting from the entry point, and ending at the exit point. In a web application, for example, this may comprise a request—response cycle. Accessibility analysis tracks "heap" object creations (objects stored in heap memory, which is dynamic random access memory (RAM)), compositions, assignments, stores, deletions, releases, etc., with the paths ("liveness") of the objects as they are passed along the control flow as determined in the previous pass (reachability analysis pass).

In some applications, the life of an object may span across functions, classes and/or modules. Such objects are global from the module's perspective, and represent shared states between modules in the application. Hence, the presence of objects that outlive nodes and edges inhibit those nodes and edges from being isolated into modules.

Accessibility analysis traverses dependency diagram 600 beginning at the root node (main 50 (class A)), and proceeding downward into the tree structure. Upon encountering a global data element, accessibility analysis fuses the participating nodes into their parent nodes. The accessibility analysis repeats this process until an object in question is found to be created, processed and destroyed fully within one node. In some embodiments, multiple such global objects exist, that are shared between nodes. Since the traversal is from the root node downward, the above process produces aggregated nodes of the largest possible size (in terms of the number of included child nodes). In some embodiments, these aggregated nodes are subsequently further broken down in a second accessibility analysis pass to produce more granular (finer grained) microservices. For example, the first accessibility analysis pass may identify "UserId" as a shared object and result in the identification of a "UserSession" microservice which encompasses all the processing for a given user session. The next pass may help to break down the UserSession microservice into smaller microservices by identifying objects shared across a smaller scope within the scope of UserSession, resulting in the creation of smaller microservices such as UserAuthentication, UserSearch, UserShoppingCart, UserOrder etc.

Figure 9:
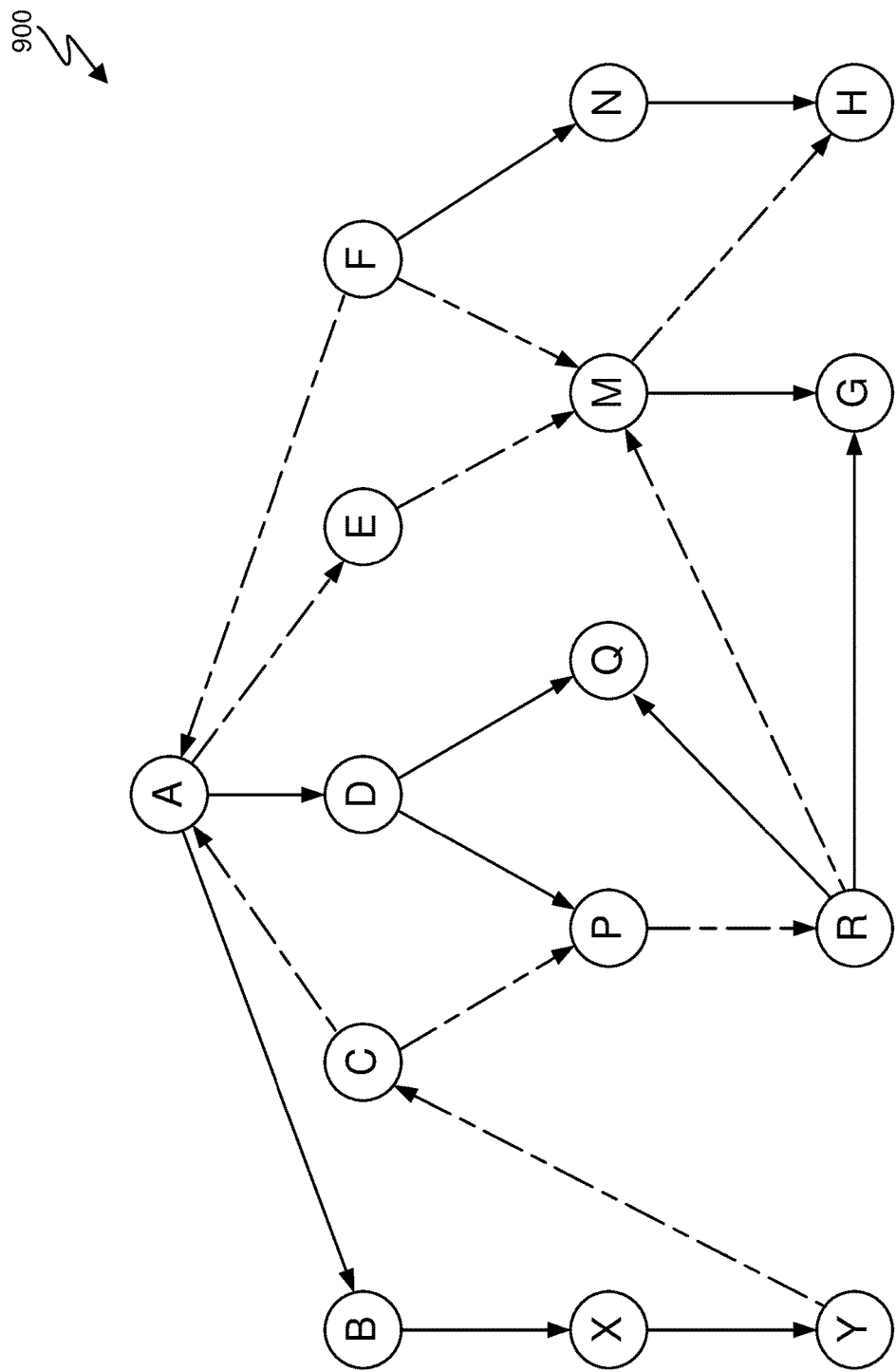
FIG. 9 is a control flow graph showing information that is generated in accordance with at least one embodiment of the present invention.

Pass four (accessibility analysis, sometimes herein referred to as code flow analysis) produces control flow graph 900 (CFG), of FIG. 9, (sometimes referred to as an accessibility analysis diagram). Control flow graph 900 (an accessibility profile for the application as a whole) is a data structure which is structurally aligned (based upon) with the initial dependency diagram 600 (the dependency graph) and reachability diagram 800 (reachability graph), but reduced in internal circuits. Control flow graph 900 is refined and weighted with results from the previous passes as well as a memory access pattern analysis conducted at runtime.

Each high level semantic (object creation, composition, assignment, store, deletion, release, etc.) has one or more corresponding byte codes/low level semantics. The managed runtime has an interpreter or dynamic compiler that encounters these byte codes. In some embodiments of the present invention, implementation proof for tracking of object creations, compositions, assignments, stores, deletions, releases, etc. involves defining a data structure to store the tracking data, and enabling trace points either in the interpreter loop or in the parser loop of the dynamic compiler that collects the trace data and store operations in the data structure.

Control flow graph 900, is a further refinement of reachability diagram 800. The nodes (for example, A, B, etc.) represent the same (function invocations, conditionals and loops) in both diagrams (reachability diagram 800 and control flow graph 900). Solid-line edges (for example, the edge from A to B) in control flow graph 900 represent statically determined dependencies between code units. Dashed-line edges represent dependencies that are derived through the accessibility phase. For example, the edge from Y to C represents object accessibility direction meaning module Y has access to module C, for example to a data element of module C, or access to a service provided by module C.

A complete representation of control flow graph 900 includes the set of edges shown in FIG. 9 overlaid with the set of edges shown in reachability diagram 800. However, for clarity in this discussion, control flow graph 900 does not show the set of edges of reachability diagram 800. The two sets of edges are independent of, and do not affect, each other. The set of edges shown in control flow graph 900 highlight the result of the accessibility pass alone.

Resource Consumption Analysis.

Resource consumption analysis (the fifth pass) further processes each node of the dependency diagram 600 (the dependency graph) with runtime resource consumption as the main focus, to determine resource consumption patterns inherent in the monolithic application. Output of the resource consumption analysis is weighted control flow graph 1000, of FIG. 10 (sometimes referred to as "resource consumption analysis diagram"). Resource consumption analysis subjects the application to central processor unit (CPU), input/output (I/O), and memory consumption analysis, starting from the entry point, and ending at the exit point (for a web application, this would be a request-response cycle). Resource consumption analysis tracks computations, function invocations, object creations, thread synchronization, thread (or process) scheduling, usage of file descriptors, sockets, stack size, etc. through control flow graph 900 (CFG) produced in the accessibility analysis phase, above.

Weighted control flow graph 1000, represents relative resource consumption as high consumption (hexagon-shaped nodes, A and M), medium consumption (circle-shaped nodes, B, C, F, G, N, P, X, and Y), and low consumption (square-shaped nodes, D, E, H, Q, and R).

In some embodiments of the present invention, resource consumption spans across functions, classes and modules. This means the resource consumption patterns may not be coherent (consistent) with the internal layout of the application.

In some embodiments, resource consumption analysis performs the following operations: (i) collects the profile data of the application; (ii) places the consumption patterns in the layout data from the previous passes; (iii) superimposes the profile data onto the final control flow graph 900 (CFG) from the previous pass (accessibility analysis); (iv) marks the percentage of resource consumption (R), of at least the CPU, memory, I/O, network bandwidth, etc., against each node of control flow graph 900 (CFG); (v) defines a heuristic or tunable attribute for high, medium and low (or perhaps finer grained units of measure) resource consumption against each resource; (vi) wherever substantial consumption (for example "high" consumption, see Resource Consumption Table 1, below) is observed, identifies the high level module that encompasses such consumption; (vii) if substantial consumption is localized in a module, highlights the module by tagging it with the associated resource consumption; (viii) if low or medium resource consumption (based on a predefined threshold, for example) is spread among multiple modules that fall in the natural path of a CFG, coalesces the multiple modules into one module; and/or (ix) re-computes the combined resource consumption and validates the new module is well within a predefined threshold.

Resource Consumption Table 1, below, shows an example classification scheme and threshold intervals for resource consumption (R) useful in some embodiments of the present invention.

TABLE 1

| Entity | Resource Consumption (R) | | |
| --- | --- | --- | --- |
| | Low | Medium | High |
| CPU (%) | R < 20 | 20 ≤ R ≤ 60 | 60 < R |
| I/O (MB/s) | R < 1 | 1 ≤ R ≤ 10 | 10 < R |
| Memory (MB) | R < 1 | 1 ≤ R ≤ 10 | 10 < R |

The previous iterations (static analysis, dependency analysis, reachability analysis accessibility analysis, and resource consumption analysis) provide a meaningful representation of the internal composition of the monolithic application. Resource consumption data identifies areas and magnitudes within the composition where the resource utilization is occurring. This information helps to realize microservices that are scalable to any desired extent.

Weighted control flow graph 1000, a result of pass five (resource consumption analysis), is a refined control flow graph (see control flow graph 900) that is weighted at least with the results determined in: (i) the code flow analysis (see reachability analysis, above); (ii) the memory access pattern analysis (see accessibility analysis, above); and (iii) the resource consumption patterns.

Some embodiments of the present invention generate multiple instances of weighted control flow graph 1000, respectively corresponding to consumption of various types of resource. For example, one instance of weighted control flow graph 1000 might represent memory usage, while another instance might show CPU usage. In some embodiments, the various instances of weighted control flow graph 1000 influence refactoring of the monolithic application into a set of microservices in different ways, depending on goals desired for the application as a whole. For example, if a goal is to minimize memory usage, a weighted control flow graph 1000 representing memory usage might factor more heavily in the final design of the application as a set of microservices. If on another hand, application latency is a primary consideration, CPU usage might be factored more heavily.

Not all embodiments of the present invention necessarily perform the five passes (phases) discussed above, nor necessarily in the order presented herein. Some embodiments practice at least a subset of the passes, in the same or different order. Some embodiments perform additional passes (more than five) with respect to other aspects of an application which are deemed useful in the overall process of restructuring an application into a set of microservices.

An Example: Restructuring Monolithic Application into Microservices.

The following discussion presents an example wherein a monolithic enterprise-scale application is refactored into a set of microservices in accordance with some embodiments of the present invention.

In this example, a Java enterprise edition (EE) web application (webapp) comprises three classes: A1.class; A2.class; and A3.class.

Figure 11:
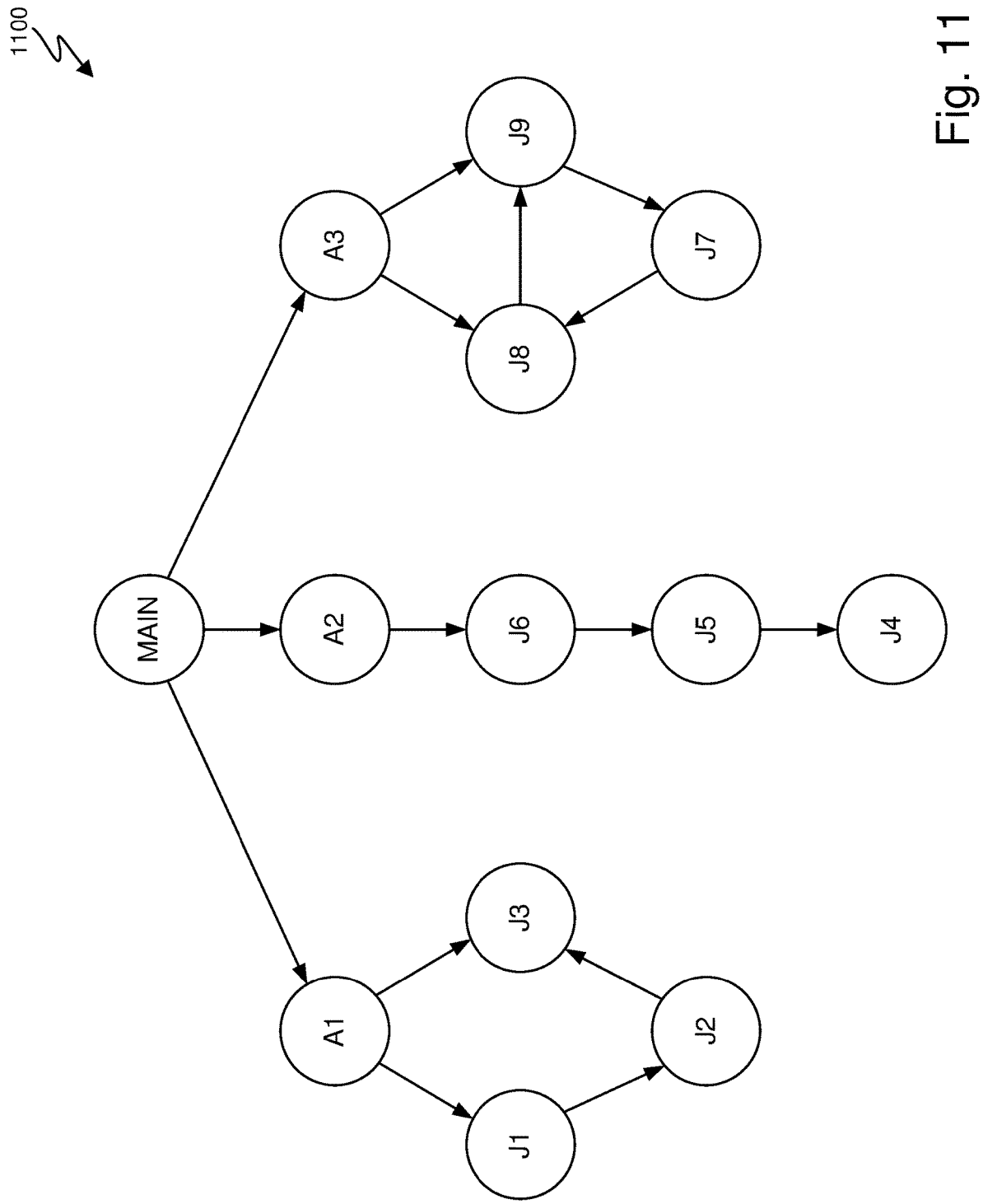
FIG. 11 is a dependency graph showing information that is generated in accordance with at least one embodiment of the present invention.

Data flow analysis applied to the webapp, conducted for example, within a broader accessibility analysis phase, produces dependency graph 1100, of FIG. 11 (sometimes herein referred to as a "dependency diagram"). Classes A1, A2 and A3 depend on classes J1 through J9 as indicated by the graph edges. For example, the edge from A1 to J1 means class A1 depends upon class J1 to provide some data (such as an account number) or a service of some description (such as performing a user authentication task).

Static analysis and semantic parsing determines that classes J1 through J9 qualify as individual microservices based on the fact that each class (J1 through J9) is free from further dependencies (apart from dependencies among J1 through J9 themselves).

Dependency analysis determines that there is no change to dependency graph 1100, based in part on the determination that there are no modules in the application.

However, a data flow analysis, conducted for example, within the broader accessibility analysis phase, finds that the webapp creates a heap object, called "userID", upon invoking a top level method in A1. The webapp then stores the heap object for sharing between J1 and J2.

As a result of the data flow analysis in the paragraph above, J1 and J2 cannot be isolated, as they share global "state-full" data (the heap object "userID").

Figure 12:
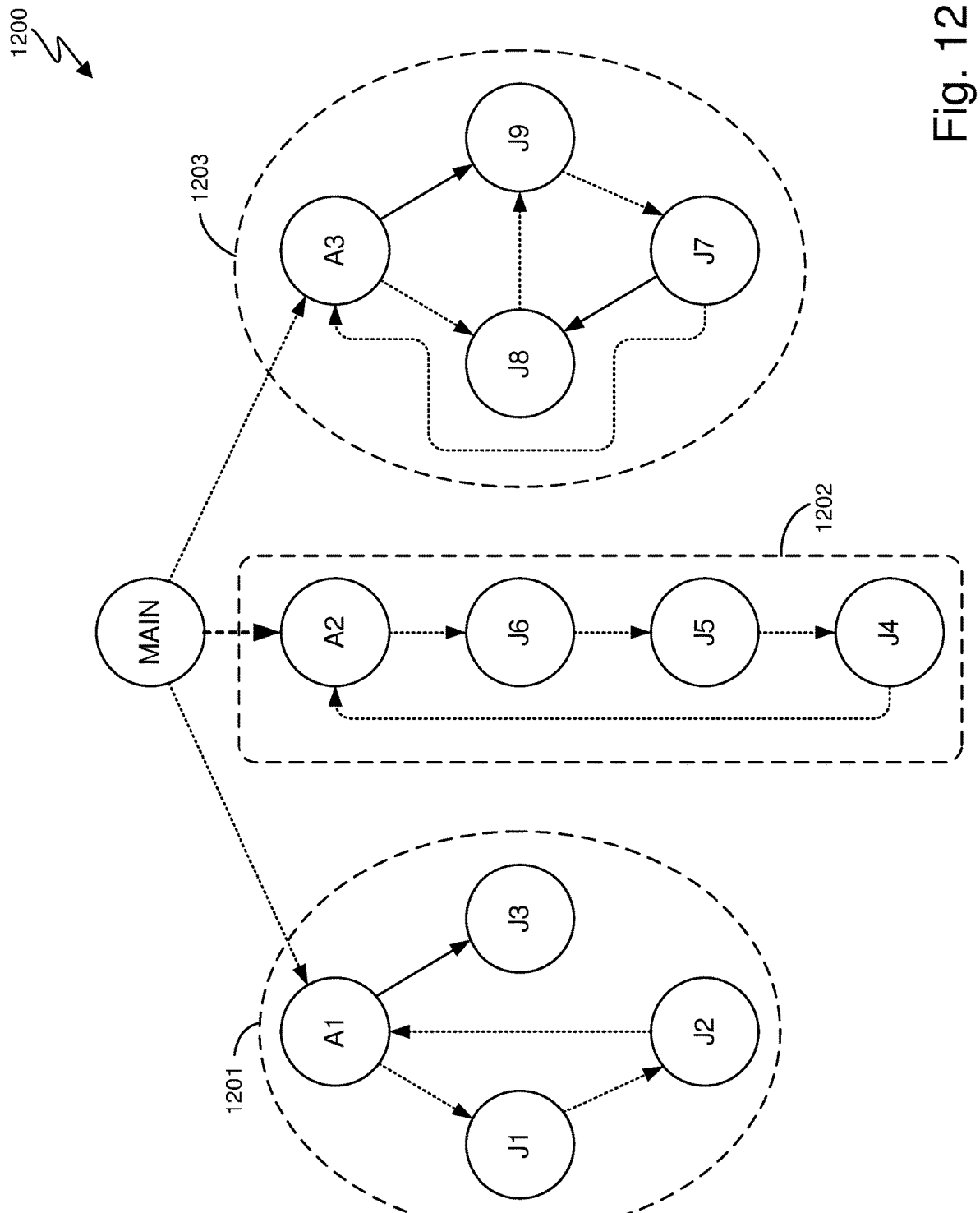
FIG. 12 is a control flow graph showing information that is generated in accordance with at least one embodiment of the present invention.

Reachability analysis follows the life cycle of "userID", and associates the trajectory of "userID" with control flow graph 1200, of FIG. 12 (sometimes herein referred to as a "reachability diagram"). In effect, reachability analysis traverses upwards from each of J1 and J2 until the global object ("userID") is found to be localized. In this case, "userID" is localized to A1.

Reachability analysis repeats the process above for other pervasive objects, and refines control flow graph 1200 by collecting classes into groups where any global objects are found to be localized, as represented by the dashed-line perimeters 1201 (comprising A1, J1, J2, and J3), 1202 (comprising A2, J4, J5, and J6) and 1203 (comprising A3, J7, J8, and J9).

Consequently, based on the groupings described in the above paragraph, reachability analysis fuses: J1, J2 and J3 into A1; J4, J5 and J6 into A2; and J7, J8, and J9 into A3.

The resultant control flow graph 1200, shows that A1, A2 and A3 (fused with respectively corresponding "J" classes as detailed in the paragraph above) each qualifies as an individual microservice.

In the present example, resource consumption analysis (sometimes herein referred to as resource consumption profile phase) produces the following findings: approximately 50 percent of the resource (CPU, memory, descriptors etc.) is consumed by A1 and its dependencies (J1, J2, and J3); approximately 40 percent is consumed by A2 and its dependencies (J4, J5, and J6); and the remainder (approximately 10 percent) is consumed by A3 and its dependencies (J7, J8, and J9).

Figure 13:
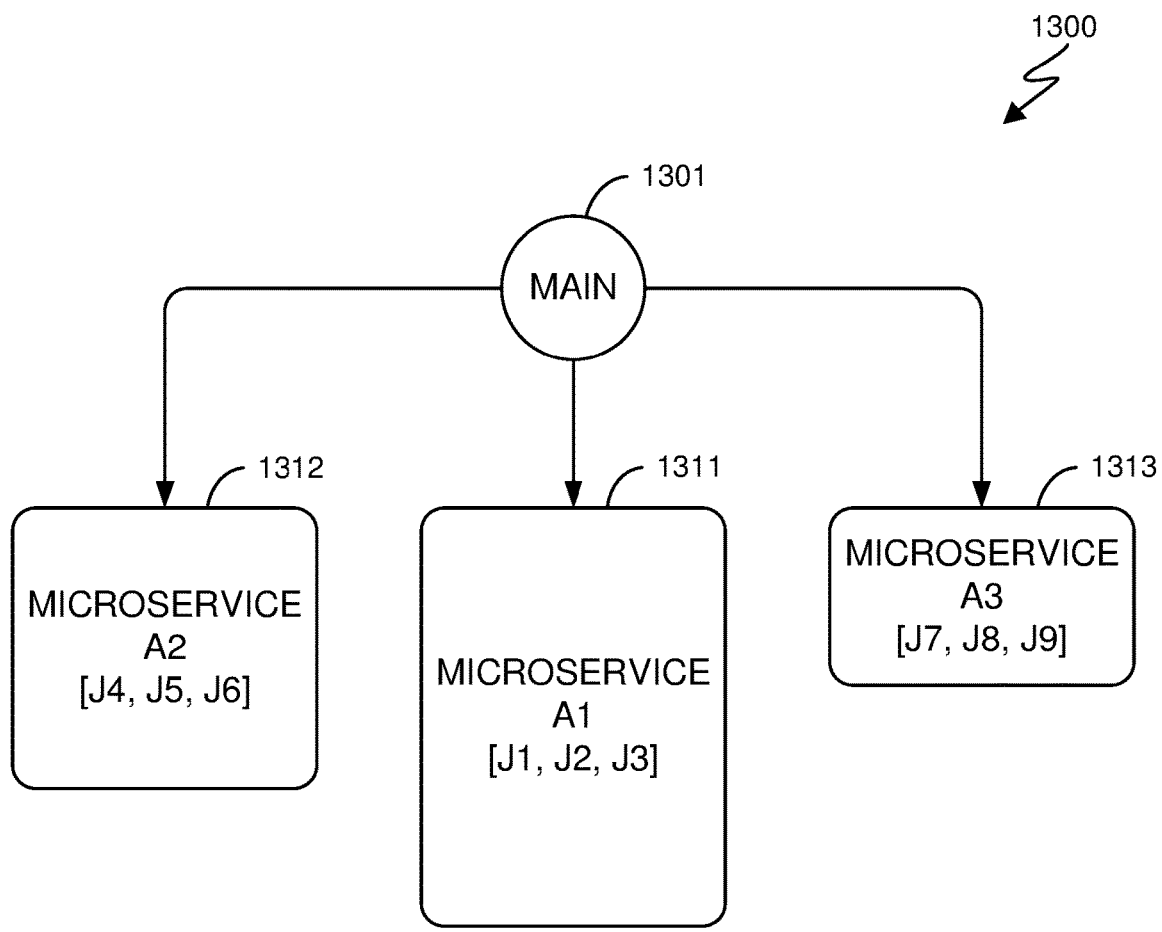
FIG. 13 is an architectural blueprint showing information that is generated in accordance with at least one embodiment of the present invention.

Architectural blueprint 1300, of FIG. 13, therefore, highlights A1, A2, and A3 as independent modules (microservices), and tags the modules with resource consumption weights, as shown by relative sizes. Main application module 1301 represents the core application. The set of microservices into which the application has been organized comprise: microservice A1 module 1311; microservice A2 module 1312; and microservice A3 module 1313. Relative resource consumption among the microservices (A1, A2, and A3) is represented in architectural blueprint 1300, by the relative sizes as follows: microservice A1 module 1311 (50% resource consumption), is shown as the largest; and microservice A3 module 1313 (10% resource consumption), is shown as the smallest.

In some embodiments of the present invention, relative resource consumption among the microservices is represented differently, for example by using colors, shapes, labels, and/or positions within the architectural blueprint, to name a few.

In some embodiments of the present invention, once an architectural blueprint has been determined for a monolithic application, application restructuring sub-module 316 of application restructuring program 300 (see FIG. 3) refactors the monolithic application into a microservice-based application in accordance with the architectural blueprint.

Subsequently, microservices deployment sub-module 318 of microservices module 314 (see FIG. 3) performs the following operations: (i) configures a test environment; (ii) deploys the microservice-based application in the test environment; (iii) receives user input indicating the microservice-based application is approved for deployment; (iv) deploys the microservice-based application in a production environment; and (v) deactivates the monolithic application. In some embodiments, microservices deployment sub-module 318 performs the operations above (in this paragraph) in conjunction with user input. In some embodiments, microservices deployment sub-module 318 performs the above operations autonomously, or at least autonomously in part and in conjunction with user input in part.

In some embodiments, data represented by abstract topology diagram 500, dependency diagram 600, reachability diagram 800, control flow graph 900, weighted control flow graph 1000, dependency graph 1100, control flow graph 1200, and/or architectural blueprint 1300 (respectively of FIGS. 5, 6, 8, 9, 10, 11, 12, and/or 13) are generated as data structures only (not necessarily rendered as graphical entities), stored in computer memory and/or computer storage. Some operations and functions performed in some embodiments of the present invention are performed based, at least in part, on these data structures without reference to any corresponding graphical renderings. The graphical renderings are included in this disclosure to aid in understanding, and are not necessarily required for practicing any particular embodiment of the present invention.

Some embodiments of the present invention programmatically generate inferences in the form of an architectural blueprint that helps to transform the monolithic application code into a plurality of independent microservices. The programmatic analysis is performed in a five-pass manner which includes static code analysis as well as dynamic profiling. The static analysis comprises understanding the static dependencies of code units in the application with the help of explicitly stated dependencies. The dynamic analysis comprises of understanding the dynamic dependency of code units in the application with the help of implicit dependencies, representing internal dependencies in the form of a connected graph where each node represents a code unit and each outgoing edge represents a dependency. The dynamic analysis further comprises understanding the memory access patterns within the code units to refine the dependency graph further. The dynamic analysis further comprises understanding resource consumption patterns within the code units to refine the dependency graph still further.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically/autonomously: without any human intervention.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, and/or application-specific integrated circuit (ASIC) based devices.

What is claimed is:

1. A computer-implemented method comprising:
   receiving a software application comprising a plurality of code blocks, including a first code block and a second code block;
   semantically parsing, in conjunction with statically analyzing, in a recursive depth-first-search manner, the plurality of code blocks of the software application, to generate an abstract topology model of the software application where the abstract topology model has a first node and a second node respectively corresponding to the first code block and the second code block;
   determining, with respect to interrelationships among and between the plurality of code blocks: (i) a dependency information; (ii) a reachability information, (iii) an accessibility information; and (iv) a runtime memory access pattern;
   creating a plurality of graphs, each graph corresponding respectively to one of: (i) the dependency information; (ii) the reachability information; (iii) the accessibility information; and (iv) the runtime memory access pattern;
   determining, respectively, a plurality of resource consumption profiles for each of the plurality of code blocks, including a first resource consumption profile corresponding to the first code block and a first resource, by refining a first graph corresponding to the accessibility information, based on at least the reachability information and the accessibility information;

generating an architectural model of the software application, based on: (i) the abstract topology model, (ii) the dependency information, (iii) the accessibility information, (iv) the reachability information, (v) the runtime memory access pattern, and (vi) the first resource consumption profile;

automatically refactoring the software application into a plurality of executable microservices based, at least in part, on the architectural model; and deploying at least one of the refactored executable microservices to a computing environment.

2. The method of claim 1, wherein:

the dependency information comprises a relationship between the first code block and the second code block where the first code block generates an output object and the second code block depends on the output object;

the reachability information comprises information with respect to a relationship between the first code block and the second code block, where the first code block has access to a data object of the second code block; and the accessibility information comprises information with respect to a relationship between the first code block and a global data object, where the first code block has access to the global data object.

3. The method of claim 1, wherein determining the dependency information comprises:

receiving the abstract topology model;

monitoring an execution of the software application, to determine a runtime dependency profile of the software application; and generating a dependency model based on the abstract topology model in conjunction with the runtime dependency profile.

4. The method of claim 3, wherein the dependency model represents dependency interrelationships among and between the plurality of code blocks.

5. The method of claim 3, wherein determining the reachability information comprises:

receiving the dependency model;

subjecting the application to runtime control flow analysis;

determining, based at least in part on the dependency model in conjunction with the runtime control flow analysis, a first subset of code blocks, of the plurality of code blocks, where the first subset of code blocks appears in both of the abstract topology model and a result of the runtime control flow analysis; and generating a reachability model based, at least in part, on a combination of the dependency model, the result of the runtime control flow analysis, and the first subset of code blocks.

6. The method of claim 5, wherein determining the accessibility information comprises:

receiving the dependency model;

receiving the reachability model;

subjecting the application to runtime data flow analysis;

identifying a path of a data object where the data object is passed among a second subset of code blocks at runtime;

fusing the second subset of code blocks into a parent code block; and generating an accessibility model based, at least in part, on the parent code block.

7. The method of claim 1, wherein:

the first resource consumption profile, with respect to the first code block, includes information selected from the group consisting of:

an amount of a resource consumed, as measured during runtime, and a predicted amount of the resource consumed, as calculated based on a static code analysis; and the first resource is selected from the group consisting of: memory footprint, storage footprint, network bandwidth, input/output traffic, central processing unit (CPU) clock cycle, CPU time, electrical power usage, and electrical energy consumed.

8. A computer program product comprising a computer readable storage medium having stored thereon program instructions programmed to perform:

receiving a software application comprising a plurality of code blocks, including a first code block and a second code block;

semantically parsing, in conjunction with statically analyzing, in a recursive depth-first-search manner, the plurality of code blocks of the software application, to generate an abstract topology model of the software application where the abstract topology model has a first node and a second node respectively corresponding to the first code block and the second code block;

determining, with respect to interrelationships among and between the plurality of code blocks: (i) a dependency information; (ii) a reachability information, (iii) an accessibility information; and (iv) a runtime memory access pattern;

creating a plurality of graphs, each graph corresponding respectively to one of: (i) the dependency information; (ii) the reachability information; (iii) the accessibility information; and (iv) the runtime memory access pattern;

determining, respectively, a plurality of resource consumption profiles for each of the plurality of code blocks, including a first resource consumption profile corresponding to the first code block and a first resource, by refining a first graph corresponding to the accessibility information, based on at least the reachability information and the accessibility information;

generating an architectural model of the software application, based on: (i) the abstract topology model, (ii) the dependency information, (iii) the accessibility information, (iv) the reachability information, (v) the runtime memory access pattern, and (vi) the first resource consumption profile;

automatically refactoring the software application into a plurality of executable microservices based, at least in part, on the architectural model; and deploying at least one of the refactored executable microservices to a computing environment.

9. The computer program product of claim 8, wherein:

the dependency information comprises a relationship between the first code block and the second code block where the first code block generates an output object and the second code block depends on the output object;

the reachability information comprises information with respect to a relationship between the first code block and the second code block, where the first code block has access to a data object of the second code block; and the accessibility information comprises information with respect to a relationship between the first code block and a global data object, where the first code block has access to the global data object.

10. The computer program product of claim 8, wherein determining the dependency information comprises:
    receiving the abstract topology model;
    monitoring an execution of the software application, to determine a runtime dependency profile of the software application; and
    generating a dependency model based on the abstract topology model in conjunction with the runtime dependency profile.

11. The computer program product of claim 10, wherein the dependency model represents dependency interrelationships among and between the plurality of code blocks.

12. The computer program product of claim 10, wherein determining the reachability information comprises:
    receiving the dependency model;
    subjecting the application to runtime control flow analysis;
    determining, based at least in part on the dependency model in conjunction with the runtime control flow analysis, a first subset of code blocks, of the plurality of code blocks, where the first subset of code blocks appears in both of the abstract topology model and a result of the runtime control flow analysis; and
    generating a reachability model based, at least in part, on a combination of the dependency model, the result of the runtime control flow analysis, and the first subset of code blocks.

13. The computer program product of claim 12, wherein determining the accessibility information comprises:
    receiving the dependency model;
    receiving the reachability model;
    subjecting the application to runtime data flow analysis;
    identifying a path of a data object where the data object is passed among a second subset of code blocks at runtime;
    fusing the second subset of code blocks into a parent code block; and
    generating an accessibility model based, at least in part, on the parent code block.

14. The computer program product of claim 8, wherein:
    the first resource consumption profile, with respect to the first code block, includes information selected from the group consisting of:
    an amount of a resource consumed, as measured during runtime, and
    a predicted amount of the resource consumed, as calculated based on a static code analysis; and
    the first resource is selected from the group consisting of: memory footprint, storage footprint, network bandwidth, input/output traffic, central processing unit (CPU) clock cycle, CPU time, electrical power usage, and electrical energy consumed.

15. A computer system comprising:
    a processor set; and
    a computer readable storage medium;
    wherein:
    the processor set is structured, located, connected and/or programmed to run program instructions stored on the computer readable storage medium; and
    the program instructions include instructions programmed to perform;
    receiving a software application comprising a plurality of code blocks, including a first code block and a second code block;
    semantically parsing, in conjunction with statically analyzing, in a recursive depth-first-search manner, the plurality of code blocks of the software application, to generate an abstract topology model of the software application where the abstract topology model has a first node and a second node respectively corresponding to the first code block and the second code block;
    determining, with respect to interrelationships among and between the plurality of code blocks: (i) a dependency information; (ii) a reachability information, (iii) an accessibility information; and (iv) a runtime memory access pattern;
    creating a plurality of graphs, each graph corresponding respectively to one of: (i) the dependency information; (ii) the reachability information; (iii) the accessibility information; and (iv) the runtime memory access pattern;
    determining, respectively, a plurality of resource consumption profiles for each of the plurality of code blocks, including a first resource consumption profile corresponding to the first code block and a first resource, by refining a first graph corresponding to the accessibility information, based on at least the reachability information and the accessibility information;
    generating an architectural model of the software application, based on (i) the abstract topology model, (ii) the dependency information, (iii) the accessibility information, (iv) the reachability information, (v) the runtime memory access pattern, and (vi) the first resource consumption profile;
    automatically refactoring the software application into a plurality of executable microservices based, at least in part, on the architectural model; and
    deploying at least one of the refactored executable microservices to a computing environment.

16. The computer system of claim 15, wherein:
    the dependency information comprises a relationship between the first code block and the second code block where the first code block generates an output object and the second code block depends on the output object;
    the reachability information comprises information with respect to a relationship between the first code block and the second code block, where the first code block has access to a data object of the second code block; and
    the accessibility information comprises information with respect to a relationship between the first code block and a global data object, where the first code block has access to the global data object.

17. The computer system of claim 15, wherein determining the dependency information comprises:
    receiving the abstract topology model;
    monitoring an execution of the software application, to determine a runtime dependency profile of the software application; and
    generating a dependency model based on the abstract topology model in conjunction with the runtime dependency profile.

18. The computer system of claim 17, wherein the dependency model represents dependency interrelationships among and between the plurality of code blocks.

19. The computer system of claim 17, wherein determining the reachability information comprises:
   receiving the dependency model;
   subjecting the application to runtime control flow analysis;
   determining, based at least in part on the dependency model in conjunction with the runtime control flow analysis, a first subset of code blocks, of the plurality of code blocks, where the first subset of code blocks appears in both of the abstract topology model and a result of the runtime control flow analysis; and
   generating a reachability model based, at least in part, on a combination of the dependency model, the result of the runtime control flow analysis, and the first subset of code blocks.

20. The computer system of claim 19, wherein determining the accessibility information comprises:
   receiving the dependency model;
   receiving the reachability model;
   subjecting the application to runtime data flow analysis;
   identifying a path of a data object where the data object is passed among a second subset of code blocks at runtime;
   fusing the second subset of code blocks into a parent code block; and
   generating an accessibility model based, at least in part, on the parent code block.

* * * * *